United States Patent [19]

Leach

[11] 4,323,845
[45] Apr. 6, 1982

[54] POWER REGULATING APPARATUS INCLUDING LOAD CURRENT SENSOR MEANS

[75] Inventor: John M. Leach, Wrexham, Wales

[73] Assignee: Gould Advance Limited, Hainault, England

[21] Appl. No.: 127,510

[22] Filed: Mar. 5, 1980

[30] Foreign Application Priority Data

Mar. 6, 1979 [GB] United Kingdom ............... 07921/79

[51] Int. Cl.³ .............................................. G05F 1/44
[52] U.S. Cl. ................................. 323/224; 323/272; 323/285; 323/351
[58] Field of Search ...................... 363/124; 323/8, 23, 323/25, 222, 224, 272, 285, 351

[56] References Cited

U.S. PATENT DOCUMENTS

| 3,564,394 | 2/1971 | Opal et al. | 323/224 |
| 3,909,698 | 9/1975 | Nill | 323/119 |
| 3,958,131 | 5/1976 | Mozdzer | 323/23 |
| 4,168,477 | 9/1979 | Burchall | 323/23 |

FOREIGN PATENT DOCUMENTS

| 1045002 | 10/1966 | United Kingdom | 363/124 |
| 541157 | 12/1976 | U.S.S.R. | 323/24 |
| 517122 | 7/1977 | U.S.S.R. | 323/24 |

Primary Examiner—William H. Beha, Jr.
Attorney, Agent, or Firm—Laubscher, Philpitt & Laubscher

[57] ABSTRACT

An a.c. regulator is disclosed including series and shunt choppers connected between a source of alternating current and an output, each chopper including a pair of unidirectional controlled rectifying paths connected in parallel opposition. The invention is characterized by the provision of a control circuit including a load current sensor for sensing the direction of flow of load current, the control being connected to render conductive a selected one of the transistors in the shunt chopper alternately with a selected one of the transistors in the series chopper, the alternation occurring at a frequency that is high relative to the supply voltage frequency.

10 Claims, 5 Drawing Figures

FIG. I.

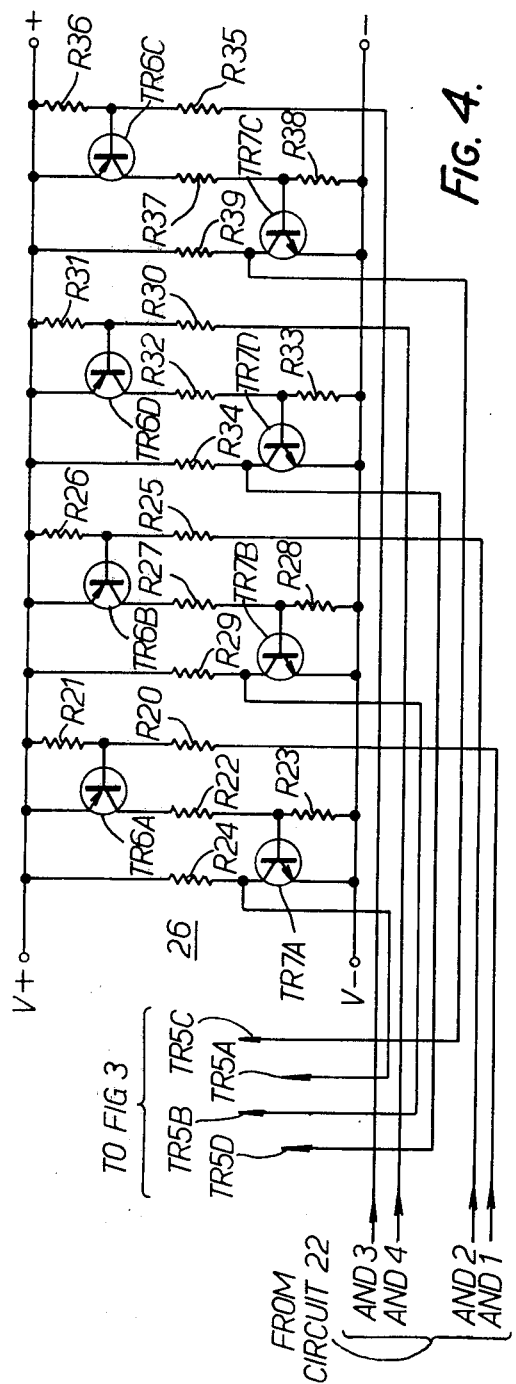
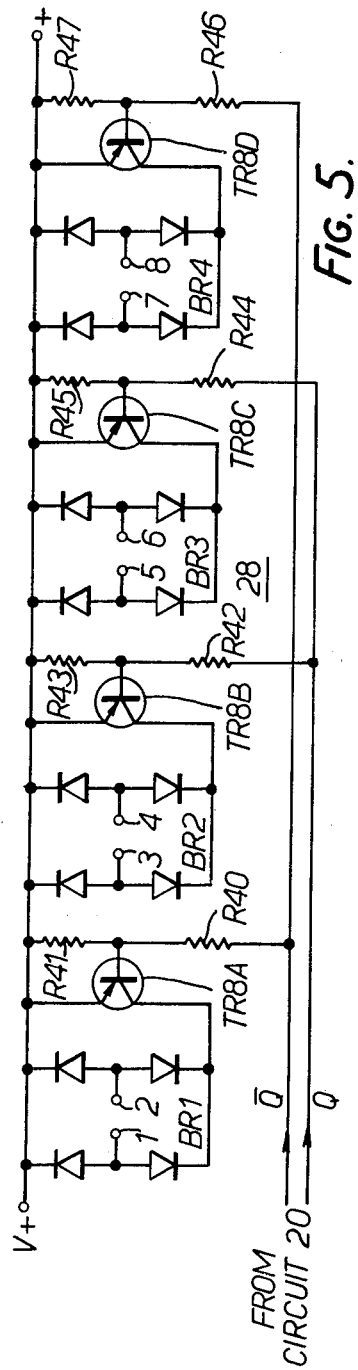
Fig. 4.
Fig. 5.

POWER REGULATING APPARATUS INCLUDING LOAD CURRENT SENSOR MEANS

BACKGROUND OF THE INVENTION

(1) Field of the Invention

The present invention relates to ac regulators of the type in which an ac input signal is chopped at a frequency which is high compared to the input frequency, typically in excess of 1 kilohertz, and the output of the chopper is then filtered to remove the high frequency component from the signal. By varying the mark to space ratio of the chopper, the output amplitude may be varied.

(2) Description of the Prior Art

AC regulators of the above type have previously been proposed and United Kingdom Pat. No. 1,045,002 discloses a number of arrangements. The basic arrangement shown in this U.K. patent has a chopper connection in series in the load current path. It was found that when the load was other than resistive, distortion and undesired voltage transients could occur at the end of each chopper pulse, and it was proposed in U.K. Pat. No. 1,045,002 to include a shunt path between the chopper and the filter in order to overcome the distortion and transient problem. The shunt path was disclosed as being a further chopper similar to the basic series chopper. The shunt and series chopper were arranged such that when the series chopper was conductive the shunt chopper was non-conductive and vice versa. In one embodiment each of the choppers was composed of a pair of anti-parallel silicon controlled rectifiers, controlled in such a manner that the anti-parallel rectifiers of the shunt chopper were conductive at the same time or the anti-parallel retifiers of the series chopper were conductive at the same time.

It has been found that such a circuit as disclosed in British Pat. No. 1,045,002 does not solve all the distortion and undesired voltage transient problems since it suffers from the problem that if the shunt silicon controlled rectifiers come on before the series silicon controlled rectifiers turn off, large currents can flow from the ac input into the switches. Alternatively if a "dead band" is utilized to prevent the simultaneous conduction and the series rectifiers are turned off before the shunt rectifers are turned on then the inductive energy in the filter has to be controlled by "snubbing" components.

It is an object of the present invention to avoid these problems by providing an electric regulator with an improved switching action.

SUMMARY OF THE INVENTION

In accordance with the invention there is provided a regulator having shunt and series choppers each of which consists of two unidirectional controlled rectifying paths connected in parallel opposition, control means being provided for rendering conductive a selected one of the controlled rectifying paths in the shunt chopper alternately with a selected one of the transistors in the series chopper. The control means is responsive to a detector for detecting the direction of flow of load current and this arrangement is particularly advantageous when the load has an inductive component.

The controlled rectifying path may be either silicon controlled rectifiers, or a series combination of a diode and a semiconductor switch such as a transistor, f.e.t. etc.

BRIEF DESCRIPTION OF THE DRAWINGS

Features and advantages of the present invention will become apparent from the following description of an embodiment thereof given by way of example when taken in conjunction with the accompanying drawings in which:

FIGS. 2, 3, 4 and 5 show in more detail parts of the regulator shown in FIG. 1.

DESCRIPTION OF THE PREFERRED EMBODIMENT

Figure 1:
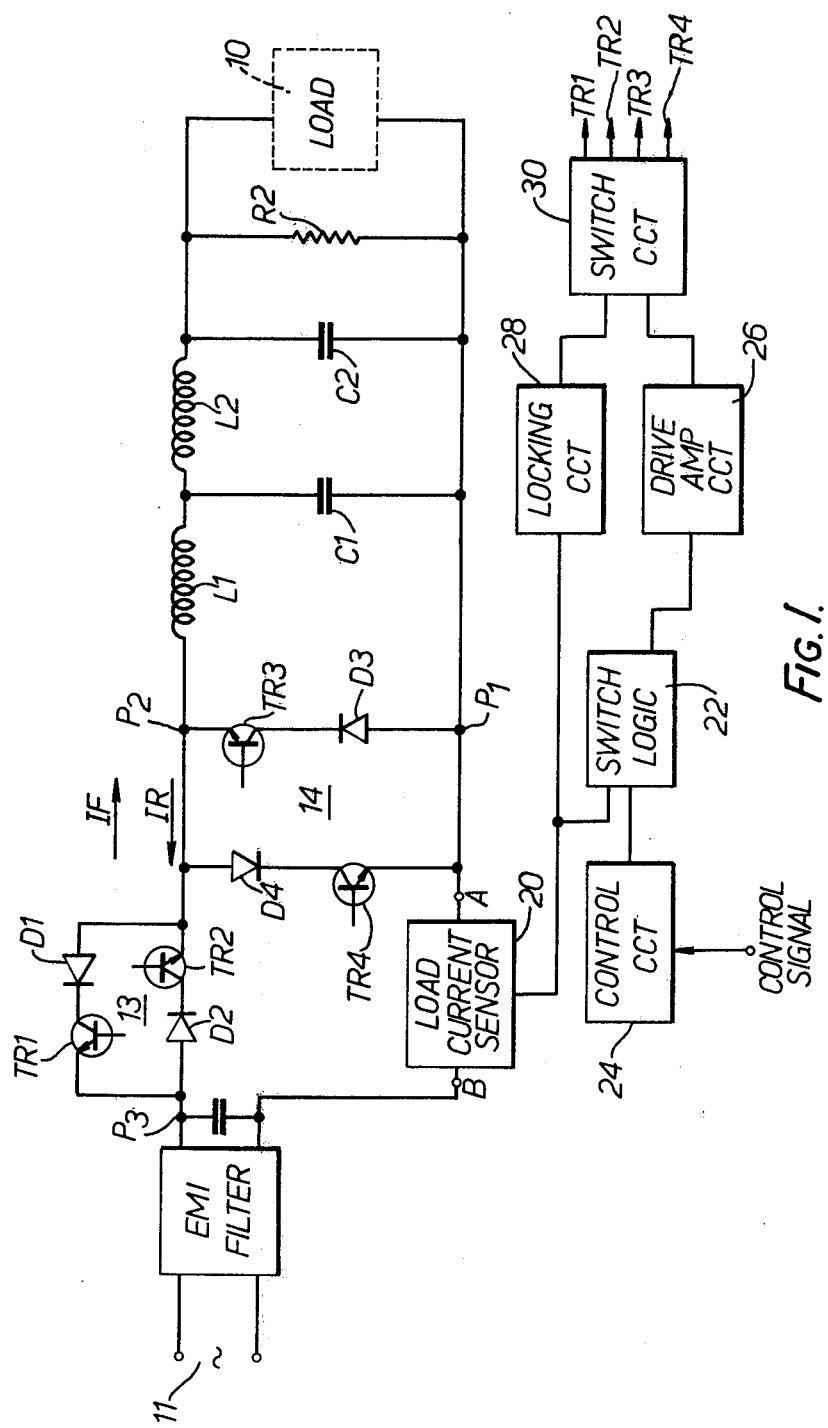
FIG. 1 is a diagrammatic representation of an ac regulator according to the present invention.

With reference to FIG. 1, a load 10 is supplied from an ac source 11 via an ac chopper regulator which is used to regulate the voltage to the load in accordance with any desired parameter (e.g., input or output voltage or current). The chopper frequency may be 20–50 KHz for an ac source of 50–60 Hz.

The regulator comprises a series chopper 13 and a shunt chopper 14 each consisting of two antiparallel (i.e., oppositely polarized) unidirectional controlled rectifying paths each in the form of a series combination of a diode and a transistor. Between the shunt chopper 14 and the load are connected two chokes L1 and L2 and two capacitors C1 and C2. Further, a bleed resistor R2 is connected in parallel with the load to provide a bleed load for open circuit and non-continuous load conditions.

Thus far, the circuit is fairly standard. However, in order to control the switching of the transistors in the choppers 13 and 14 in this embodiment, one senses the direction of load current flow and switches the transistors accordingly. Furthermore, one transistor of one chopper is alternately rendered conductive with one transistor of the other chopper at the chopper frequency (e.g., TR1 and TR4 are alternately rendered conductive for load current flow in one direction and TR2 and TR3 for load current flow in the other direction). The reason for this will now be explained in more detail.

When current is flowing in the direction of arrow $I_R$ the paths including transistors TR1 and TR4 must conduct alternately; diodes D2 and D3 serve to prevent TR2 and TR3 from being reverse biased. When current is flowing in the direction of arrow $I_F$ the paths including transistors TR2 and TR3 must conduct alternately; diodes D1 and D4 stop TR1 and TR4 from becoming reverse biased.

Considering now the condition that the current is flowing in the direction of arrow $I_R$ and transistor TR1 is conducting, it is vital that transistor TR3 should not conduct during this time because this will result in a conduction path across the voltage supply and the instantaneous destruction of transistors TR1 and TR3. When TR1 turns off TR4 should be on in order to provide a path for the current flowing in L1 and L2. The purpose of transistors TR3 and TR4 is to pre-select the diode required to carry the commutation current (D3 or D4). If this pre-selection is too late a large voltage spike is produced because there is no path for the choke current and so the chokes produce a large back E.M.F. which also destroys the transistors. Clearly, provided the transistor to be turned on is turned on during the storage time or earlier of the previously conducting transistor and that the correct pair of switches (TR1 and TR4, or TR2 and TR3) is selected, then there will be no simultaneous conduction and the choke current will always be under control.

A load current sensor 20 is connected between points A and B in the load current path and a transition from one direction to the other is sensed and fed to a switch logic circuit 22 which, in response to sensor output, gates a control signal from a control circuit 24 to determine which two transistors to alternately render conductive and for how long. The logic circuit 22 provides an output to an amplifier drive circuit 26 for driving the desired two transistors. The output from the sensor 20 is also fed to a locking circuit 28 to ensure that the other two transistors are hard off. The outputs from the circuits 26 and 28 are fed to a switching circuit 30 which actually applies appropriate control signals to the appropriate transistors.

The operation of the current sensor 20 will now be described in more detail with reference to FIG. 2. The sensor 20 comprises a current sensing means in the form of two anti-parallel (i.e., oppositely connected) diodes D5 and D6 connected in parallel with a resistor R1, the combination being connected between the points A and B marked in FIG. 1. One side of the combination is connected to the inverting input of a comparator COMP 1 and the non-inverting input of a comparator COMP 2. Voltage references are provided by a series chain of a resistor R3, diodes D7, D8 and a resistor R4 connected across a source of voltage V+, V−. The voltage reference between resistor R3 and diode D7 is fed to the non-inverting input of comparator COMP 1 and that between diode D8 and resistor R4 is fed to the inverting input of comparator COMP 2. The junction between the diodes D7, D8 is connected to the other side of the combination of diodes D5, D6 and resistor R1, and also to the junction between a zener diode ZD1 and a resistor R5 also connected across the voltage source V+, V−. The outputs of the comparators COMP 1 and COMP 2 are connected to the positive rail V+ by resistors R6, R7, respectively, and to a D-type flip-flop IC2 via an AND-gate 5. The Q and $\overline{Q}$ outputs of the flip-flop IC2 select respectively one and the other parts of transistors in the choppers to be rendered alternately conductive, and are fed to the switch logic circuit 22 for this purpose.

In operation, current flow between points A and B shows as a voltage across resistor R1 whose polarity is dependent on the direction of current flow. Diodes D5, D6 limit the magnitude of this potential and thereby prevent damage to subsequent circuit elements as well as preventing excessive voltage drop across the resistor. The voltage across resistor R1 is compared with the reference voltages fed to the comparators COMP 1, 2 and the outputs of the comparators are indicative of the direction of current flow, setting the Q and $\overline{Q}$ outputs of flip-flop IC2 accordingly, depending on whether the output of COMP 1 or COMP 2 is high.

The current sensing is non-linear and operates even for open circuit conditions due to the presence of the bleed load resistor R2.

At initial switch-on, the flip-flop IC2 randomly selects one output Q or $\overline{Q}$. If the wrong output is selected for the polarity of the input ac signal from the source 11, there is no load current flow because the diodes associated with the transistors selected by the wrong output are reversed biased. However, when the voltage supply next changes polarity the diodes become forward biased and load current flows and can be sensed. The next transition of load current through zero is sensed and causes the flip-flop IC2 to change over. The circuit is thus self correcting and self starting.

The flip-flop IC2 is needed since there is a dead band for the comparators COMP 1 and COMP 2 and all transistors may be off which means that operation would not be self starting. Further, if all transistors were on, the input to the regulator would be short circuited. At unity power factor this is no problem but at zero power factor this occurs at maximum input voltage. Thus, at the end of a given flow of current cycle IC2 selects the other pairs of transistors in anticipation of current reversal.

Figure 2:
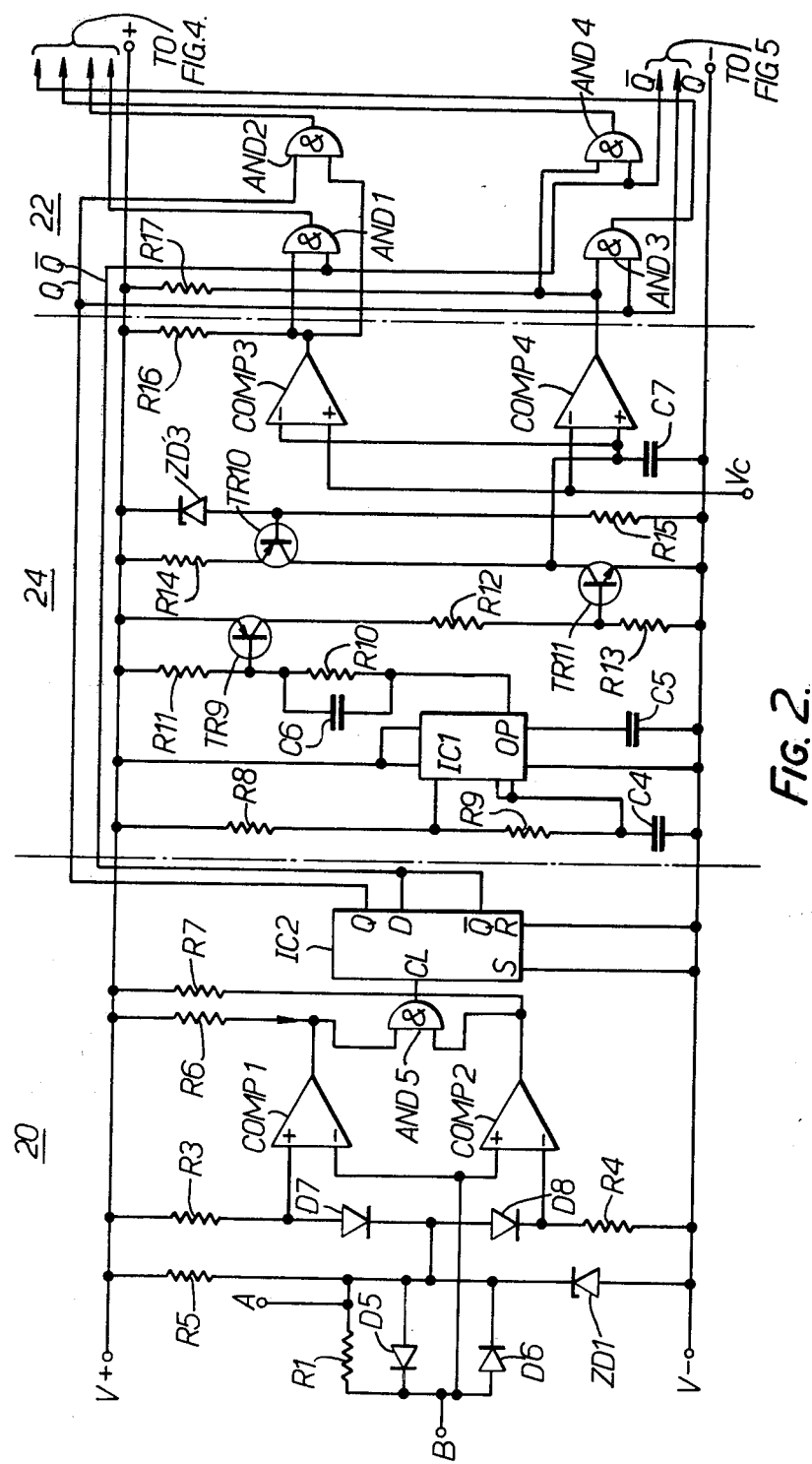

The two transistors selected to be on by the flip-flop IC2 are also controlled as to the length of their conductive period by the control circuit 24 which in this embodiment is a pulse width modulator based on a type 555 timer IC1 which is shown in FIG. 2. Referring to FIG. 2, the timer IC1, connected as shown to resistors R8, R9, R10, R11 and capacitors C4, C5, C6, forms a pulse generator which provides a train of pulses at the output OP of IC1. The pulses are inverted by a transistor TR9 in association with resistors R12, R13 and used to pulse on a transistor TR11. A transistor TR10 in combination with resistors R14, R15 and zener diode ZD 3 form a constant current source which charges a capacitor C7. The voltage on capacitor C7 is reset to zero by every pulse from IC1, thus producing a linear saw-tooth across capacitor C7 of the same frequency as the pulses from IC1. The output of the saw-tooth generator is fed to two inverse connected comparators COMP3 and COMP4 where the ramp of the saw-tooth is compared with a control voltage $V_c$. The outputs of the comparators COMP3 and COMP4 are fed to the switch logic circuit 22.

Since the comparators COMP3 and COMP4 are inverse connected, their outputs will be mutually complementary. There will be a change of state of the comparators when their saw-tooth ramp exceeds the control voltage $V_c$. Thus the outputs of comparators COMP3 and COMP4 will provide rectangular waveforms whose duty ratio depends on the magnitude of the control voltage $V_c$; i.e., the outputs are pulse width modulated by the control voltage.

The switch logic circuit 22 receives the two complementary outputs from the comparators COMP3 and COMP4, and also the Q, $\overline{Q}$ oututs from the flop-flop IC2 of the current sensor 20. The circuit 22 comprises four AND gates, AND1-4, which effectively gate the two complementary pulse width modulated waveforms to the two transistors, i.e. TR1, TR4 or TR2, TR3, which have been selected by the Q, $\overline{Q}$ outputs of the flip-flop IC2. These waveforms are fed to the correct pair of transistors via the drive amplifier circuit 26 shown partly in more detail in FIG. 4.

Referring to FIG. 4, the output of AND gate 1 is connected via a resistor R20 to an amplifying stage comprising transistors TR6A, TR7A; resistors R21, 22, 23, 24—connected as shown. The output from the collector of transistor TR7A is fed to a transistor TR5A shown in FIG. 3, which shows the remaining part of drive amplifier circuit 26. The amplifying stage including transistors TR6A, TR7A amplifies in conventional manner the drive signals applied thereto. It will be seen that the three other corresponding amplifying stages, comprising transistors TR6B, TR7B—TR6C, TR7C—TR6D, TR7D—respectively together with resistors R25-39, function in identical manner with respect to the gates AND-2, AND-3 and AND-4 respectively.

The two transistors selected by the flip-flop IC2 to be non-condutive are held hard off by the Q, $\overline{Q}$ outputs of flip-flop IC2 fed to the locking circuit 28 which is shown in more detail in FIG. 5. This both ensures precise turn-off of the transistors and prevents undesired switching of the transistors intended to be non-conductive such as might be caused by spurious transients in the power supply. Referring to FIG. 5, the Q, $\overline{Q}$ outputs of flip-flop IC2 from circuit 20 are connected to the bases of transistors TR8B, TR8C and TR8A, TR8D respectively. Each of transistors TR8A, B, C, D is connected between collector and emitter to a respective bridge rectifier arrangement BR1, BR2, BR3, BR4. If the $\overline{Q}$ output of IC2 goes low, then transistors TR8A and TR8D are rendered conductive and hence a short circuit is applied between terminals 1, 2 and 7, 8. Terminals 3, 4 and 5, 6 likewise have short circuits applied therebetween in the presence of a signal on the Q output of IC2. These short circuits are effectively of dual polarity due to the bridge rectifier arrangements. Resistors R40-R47 act as potential dividers for the base drive from outputs Q, $\overline{Q}$.

Figure 3:
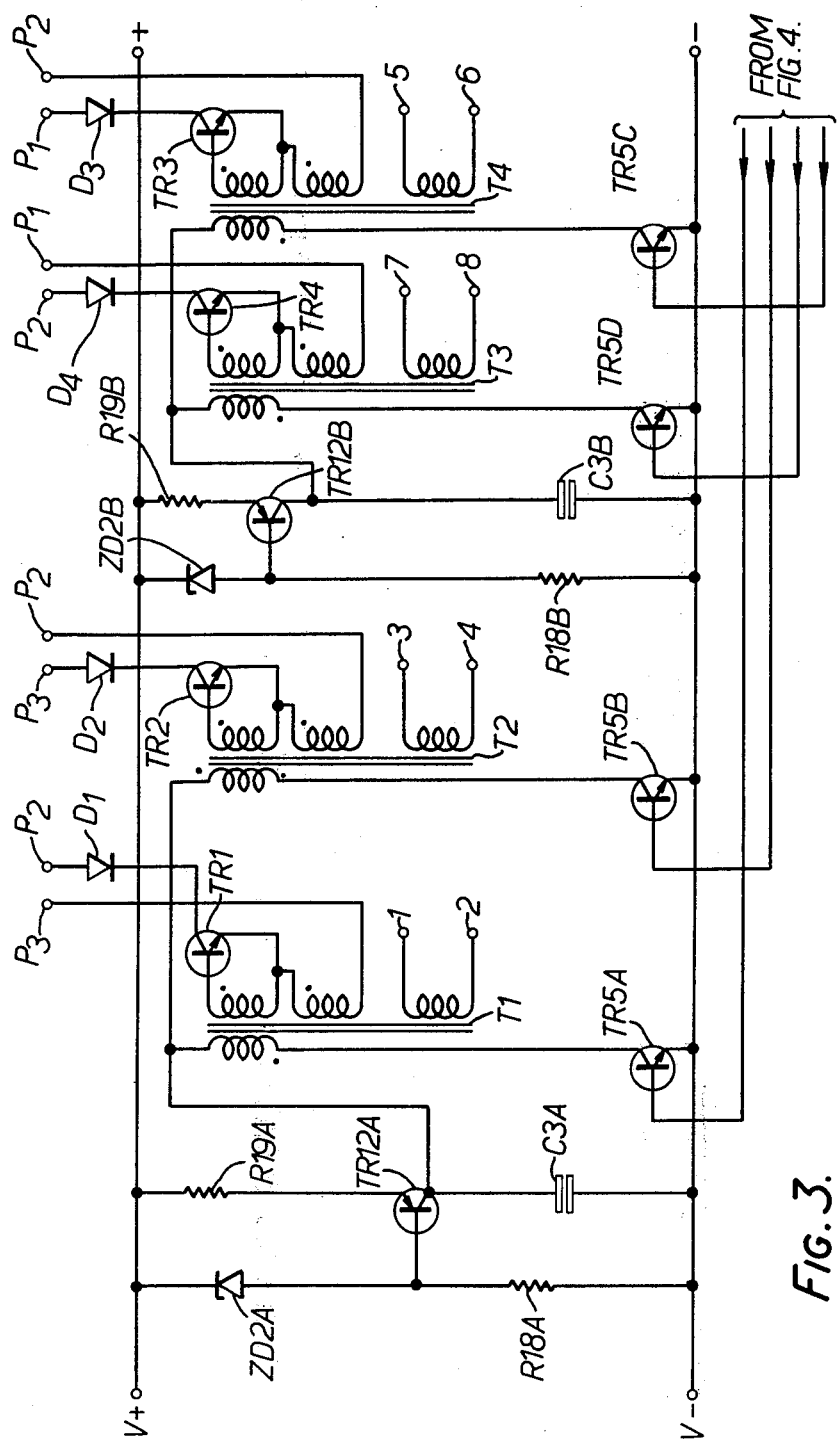

Referring to FIG. 3, the remainder of the drive amplifier circuit 26 is shown together with the semiconductors of the shunt and series choppers. The outputs of transistors TR7A-D (FIG. 4) are fed to the bases of transistors TR5A-D respectively. As FIG. 3 shows four circuits having similar operation, only that circuit associated with transistor TR5A will be described in detail. The collector of transistor TR5A is connected via a drive winding of transformer T1 to a constant current source comprising a zener diode ZD2A, resistors R18A, R19A and transistor TR12A connected across the voltage source V+, V−. A capacitor C3A is connected between the collector of transistor TR12A and the negative line V−. The transformer T1 includes a base drive winding connected between the base and emitter of series chopper transistor TR1, a feedback winding in the switched current path of transistor TR1 and a short circuit winding having terminals 1, 2 connected to the similarly-referenced terminals of the locking circuit 28 shown in FIG. 5. Transistor TR1 is shown connected in series with diode D1, the series combination having connections P$_2$, P$_3$ corresponding to similarly-referenced connections in FIG. 1. However, in the embodiment of FIG. 5, the feedback winding of transformer T1 is also included in the switched current path.

In operation, drive pulses from transistor TR7A of circuit 26 in FIG. 4 switch off transistor TR5A thereby interrupting current flow through the drive winding of transformer T1. The current induced in the base drive winding switches on transistor TR1. When the locking circuit 28 provides a short circuit between terminals 1 and 2 as described with reference to FIG. 5, the transistor TR1 is held off until the short circuit is removed. Similar connections and operation apply to the circuits including the other three chopper transistors TR2, TR3, TR4 including transistors TR5B, TR5C, TR5D respectively and transformers T2, T3, T4 respectively.

Accordingly, the two transistors selected by the flip-flop IC2 to be non-conductive are held hard off by the outputs of the flip-flop IC2 being fed to the locking circuit 28. If the $\overline{Q}$ output of IC2 goes low than transistors TR8A and TR8D are rendered conductive and hence a short circuit is applied to transformers T1 and T3 to drive transistors TR1 and TR4 hard off via terminals 1 and 2 and 7 and 8 respectively which are shown on both FIGS. 3 and 5. Transistors TR2 and TR3 are likewise driven hard off in the presence of a signal on the Q output of IC2. The truth table of the switch steering logic is shown below:

| $\overline{IC2Q}$ | IC2Q | COMP3 | COMP4 | TR1 | TR2 | TR3 | TR4 |
|---|---|---|---|---|---|---|---|
| 0 | 1 | 0 | 1 | 0 | 1 | 0 | 0 |
| 0 | 1 | 1 | 0 | 0 | 0 | 1 | 0 |
| 1 | 0 | 1 | 0 | 0 | 0 | 0 | 1 |
| 1 | 0 | 0 | 1 | 1 | 0 | 0 | 0 |

Because of the type of control used, namely that one transistor in each chopper is alternately conductive with one transistor in the other chopper, it is important that the choppers should not be bipolar in the normal sense. While each chopper must be capable of conduction in either direction, it must be ensured that the polarity of the current flow is selected by the control apparatus. Thus, each path in each chopper must have a unipolarity switch.

The control of the output a.c. current is performed by varying the duty ratio of the parts of each cycle of chopper frequency during which either of each selected pair of transistors is on; i.e. TR1 and TR4, or TR2 and TR3. In other words the ratio of the on times of each selected pair of transistors being switched is varied. This is achieved by comparing the saw-tooth waveform across C7 with the control voltage $V_c$ in comparators COMP3 and COMP4. The outputs of these comparators are accordingly mutually complementary rectangular waveforms whose duty ratios are dependent on the magnitude of the control voltage $V_c$; i.e. the waveforms are pulse width modulated by the magnitude of the control voltage. The AND-gates of the switch logic circuit 22 then direct these pulse width modulated switching waveforms to the required pair of transistors to be rendered alternately conductive, and the magnitude of the output is dependent on the duty ratio of the relative conductive times of these transistors.

The above apparatus allows a chopper regulator to supply regulated ac current from an ac source even when the load is reactive. The output ac current can be controlled in several ways, e.g., open loop with a dc source for the control signal $V_c$; feed forward using an integrated version of a parameter of the input; feedback using an integrated version of a parameter of the output; or an error amplifier and reference.

What is claimed is:
1. In an electric regulating apparatus including
 (a) input terminal means adapted for connection with a source of alternating current;
 (b) output terminal means adapted for connection with a load;
 (c) series chopper means connected in series between said input terminal means and said output terminal means, said series chopper means including two unidirectional controlled rectifying paths connected in parallel opposition;
 (d) shunt chopper means connected in parallel across said output terminal means, said shunt chopper means including two unidirectional controlled rectifying paths connected in parallel opposition; and
 (e) control means for controlling said rectifying paths of said series and shunt chopper means by providing switching signals to said series and shunt chop- per means at a frequency higher than that of said alternating current source;

the improvement which comprises (f) load current sensing means for sensing the direction of flow of current between said input and said output terminal means;

(g) said control means being responsive to said load current sensing means for rendering conductive first controlled rectifying paths in said series and in said shunt chopper means at said higher frequency when said flow of current is in one direction, and for alternately rendering conductive second controlled rectifying paths in said series and in said shunt rectifying means at said higher frequency when said flow of current is in the other direction, said alternately conductive paths in said series and shunt rectifying means being so selected as to enable flow of load current in the sensed direction, respectively.

2. An electric regulator as claimed in claim 1 wherein said unidirectional controlled rectifying paths of said series and shunt chopper means are provided by semiconductor switching devices.

3. An electric regulator as claimed in claim 2 wherein each said unidirectional controlled rectifying path is provided by a series combined of a diode and a switching transistor.

4. An electric regulator as claimed in claim 1 wherein said control means is responsive to a control signal to provide said switching signals to said series and shunt chopper means, said switching signals determining the duty ratio of the conduction times of each one of the selected alternate controlled rectifying paths in said series and shunt chopper means, thereby to regulate said output.

5. An electric regulator as claimed in claim 4 wherein said control signal is derived from a parameter of said input.

6. An electric regulator as claimed in claim 4 wherein said control signal is derived from a parameter of said output.

7. An electric regulator as claimed in claim 4 wherein said control means includes means for providing a sawtooth waveform, and means for comparing said sawtooth waveform with said control signal thereby to provide a compared signal.

8. An electric regulator as claimed in claim 7 wherein said control means further includes a switch logic circuit responsive to said load current sensing means and said compared signal thereby to provide said switching signals.

9. In an electric regulating apparatus including (a) input terminal means adapted for connection with a source of alternating current;

(b) output terminal means adapted for connection with a load;

(c) series chopper means connected in series between said input terminal means and said output terminal means, said series chopper means including two unidirectional controlled rectifying paths connected in parallel opposition;

(d) shunt chopper means connected in parallel across said output terminal means, said shunt chopper means including two unidirectionally controlled rectifying paths connected in parallel opposition; and (e) control means for controlling said rectifying paths of said series and shunt chopper means by providing switching signals to said series and shunt chopper means at a frequency higher than that of said alternating current source;

the improvement which comprises (f) load current sensing means for sensing the direction of flow of current between said input and said output terminal means;

(g) said control means being responsive to said load current sensing means for rendering conductive first controlled rectifying paths in said series and in said shunt chopper means at said higher frequency when said flow of current is in one direction, and for alternately rendering conductive second controlled rectifying paths in said series and in said shunt rectifying means at said higher frequency when said flow of current is in the other direction, said alternatively conductive paths in said series and shunt rectifying means being so selected as to enable flow of load current in the sensed direction, respectively;

(h) said control means also including a locking circuit responsive to said load current sensing means for maintaining non-conductive the other controlled rectifying path in each of said series and shunt chopper means which is not selected by said control means.

10. An electric regulator as claimed in claim 9, wherein each said unidirectional controlled rectifying path comprises a series combination of a diode and a switching transistor, each said switching transistor having a base drive circuit which includes a winding on a respective transformer, said locking circuit selectively applying a short circuit to a further winding of the respective transformer, thereby to ensure non-conduction of said switching transistor.

* * * * *